United States Patent
Schäfer

(10) Patent No.: US 9,695,303 B2
(45) Date of Patent: Jul. 4, 2017

(54) RUBBER COMPOSITIONS

(71) Applicant: ALLNEX GERMANY GMBH, Wiesbaden (DE)

(72) Inventor: Ralph Schäfer, Wiesbaden (DE)

(73) Assignee: ALLNEX GERMANY GMBH, Wiesbaden (DE)

(*) Notice: Subject to any disclaimer, the term of this patent is extended or adjusted under 35 U.S.C. 154(b) by 0 days.

(21) Appl. No.: 14/396,467

(22) PCT Filed: Apr. 28, 2013

(86) PCT No.: PCT/EP2013/058828
§ 371 (c)(1),
(2) Date: Oct. 23, 2014

(87) PCT Pub. No.: WO2013/160482
PCT Pub. Date: Oct. 31, 2013

(65) Prior Publication Data
US 2015/0119527 A1    Apr. 30, 2015

(30) Foreign Application Priority Data

Apr. 27, 2012 (EP) .................................. 12165832

(51) Int. Cl.
*C08L 7/00* (2006.01)
*B60C 1/00* (2006.01)
*C08K 5/205* (2006.01)
*C08J 3/20* (2006.01)

(52) U.S. Cl.
CPC ........ *C08L 7/00* (2013.01); *B60C 1/00* (2013.01); *C08J 3/203* (2013.01); *C08K 5/205* (2013.01); C08J 2307/00 (2013.01); C08J 2461/22 (2013.01); C08L 2205/03 (2013.01)

(58) Field of Classification Search
CPC ........ C08L 7/00; C08L 2205/03; C08L 61/22; C08K 5/205

USPC .......................................................... 525/139
See application file for complete search history.

(56) References Cited

U.S. PATENT DOCUMENTS

| 3,723,377 | A  | * | 3/1973  | Spangler ............... C08K 5/205 38/144 |
| 5,057,610 | A  | * | 10/1991 | Pastor et al. .......... C07C 271/06 544/196 |
| 6,696,523 | B1 |   | 2/2004  | Scholl et al. |
| 2002/0124927 | A1 |   | 9/2002  | Duddey |
| 2004/0062871 | A1 | * | 4/2004  | Ohrbom et al. ...... C08F 212/14 427/385.5 |
| 2004/0127616 | A1 |   | 7/2004  | Wentworth et al. |
| 2005/0032978 | A1 | * | 2/2005  | O'Dwyer et al. ........ C08F 8/28 525/123 |
| 2012/0095152 | A1 |   | 4/2012  | Schäfer et al. |

FOREIGN PATENT DOCUMENTS

| DE | 10 2004 059 775 | 6/2006 |
| EP | 1 216 851 | 6/2002 |
| EP | 2 253 649 | 11/2010 |
| WO | 00/68311 | 11/2000 |

OTHER PUBLICATIONS

International Search Report issued Jun. 19, 2013 in International (PCT) Application No. PCT/EP2013/058828.

* cited by examiner

*Primary Examiner* — Mike M Dollinger
(74) *Attorney, Agent, or Firm* — Wenderoth, Lind & Ponack, L.L.P.

(57) ABSTRACT

The invention relates to a rubber composition comprising a rubber and a processing additive wherein the processing additive is a functional reactive diluent having at least one functional group in the molecule which is not an olefinic unsaturation, to a process of compounding such rubber compositions, and to the use thereof.

12 Claims, No Drawings

RUBBER COMPOSITIONS

BACKGROUND OF THE INVENTION

The invention relates to rubber compositions comprising a rubber compound and a processing additive, to a method of preparation thereof, and to a method of use of such rubber compositions in mechanical rubber goods, particularly in tyres.

Many various chemicals, usually referred to as "Rubber Chemicals and Additives", are used in manufacturing of rubber-elastic materials. They serve to simplify and facilitate the compounding process, to control the elastomer properties of the compounded rubber material, and to protect the material during compounding, and thereafter as finished product, from deterioration. Among these are vulcanisation chemicals which support crosslinking of the rubber, particularly sulphur, sulphur donors, and peroxides, activators such as zinc oxide, and accelerators such as sulphenamides, thiazoles, thiurams, and dithiocarbamates. Hardness of the rubber compound can be influenced by fillers, among which carbon black and the so-called white fillers, mainly silica, calcium carbonate, and kaolin are noted.

If carbon black is used to increase the hardness of a rubber composition, the viscosity of the rubber mixture is also largely increased which adversely affects the mixing process. Plasticisers are used in such case to reduce the viscosity, mostly mineral oils, the so-called process oils. However, mineral oils remaining in the ready-made rubber compound reduce the hardness and stiffness. It is therefore an object of the invention to provide a replacement for process oils that is able to reduce the viscosity of the rubber composition during mixing, but does not lead to lower hardness and stiffness of the rubber composition, and of vulcanised parts made therefrom. Particularly, it is desired to provide a replacement for process oils that allow to make mechanical rubber goods with a high stiffness and bending strength. Such strength and stiffness are particularly needed in the apex region of tyres which is a part of the bead area of a tyre which also ensures the seating of the tyre on the rim.

SUMMARY OF THE INVENTION

The so-called "liquid natural rubber" grades which are high molar mass compounds derived from natural polyisoprene, having a glass transition temperature of −65° C. and being available in different viscosities ranging from 35 Pa·s to 400 Pa·s measured at 38° C., have been used as plasticisers to lower the processing viscosity of rubber compounds, and are co-vulcanised with these. These plasticisers do, however, not increase the strength and stiffness of rubber compounds obtained with their aid beyond the values obtained with a non-plasticised rubber compound. It was therefore an object of the invention to provide plasticisers that reduce the viscosity of a rubber formulation during compounding, but do not lower the strength and stiffness of the vulcanised rubber compound.

This object has been achieved by replacing at least a part of the mineral oils used as compounding aid or plasticiser by functional reactive diluents that serve as solvent or plasticiser during the initial part of the rubber mixing and compounding process, but co-react with at least one constituent of the rubber composition during compounding and vulcanisation by virtue of functional groups in their molecules which are not an olefinic unsaturation. The compounding process is thereby improved in the way that the viscosity, and hence, the energy consumption, during mixing and compounding is reduced at least in the first part of the compounding process. Care has therefore to be exercised that the reactive diluent does not enter into premature reactions with other constituents of the rubber mixture. The functional reactive diluents according to this invention are characterised by the presence of at least one functional group in the molecule of the said functional reactive diluent which is not an olefinic unsaturation, and which is preferably selected from the group consisting of an epoxide group, an aziridine group, an N-alkylolamide group, an N-alkoxyamide group, an isocyanate group, a carbodiimide group, and electron withdrawing groups such as a nitro group, or an oxo acid group or derivatives thereof, particularly a carboxyl, a carboxylic acid anhydride, a carboxylic ester, or acyl halogenide group, and an activated olefinically unsaturated group which is activated by at least one neighbouring carboxyl, carboxylic acid anhydride, or acyl halogenide group.

For the purpose of this invention, such activated olefinically unsaturated groups are considered different from a usual olefinic unsaturation, and are therefore not encompassed in this expression.

"Olefinic unsaturation" as used herein therefore is a group

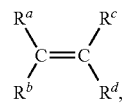

where $R^a$, $R^b$, $R^c$ and $R^d$ are selected from the group consisting of a hydrogen atom, and an organic radical where the carbon atom in this organic radical bound to either of the two carbon atoms shown in the above formula does not carry a double bond, and is not connected to an atom which is neither carbon nor hydrogen.

The preferred functional groups have as structural elements the following:

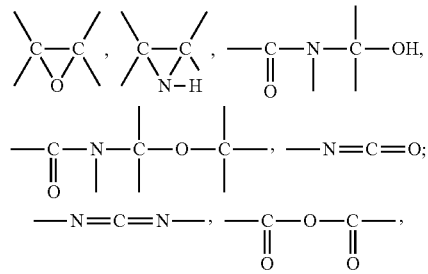

—CO—OH, or —CO-Hal, and also including an activated olefinically unsaturated group as explained supra.

Particularly preferred are reactive diluents having at least one of the following groups:
  N-methylol carbamate groups of formula R—O—CO—NX—CHR'—OH,
  dimethyl ether structures of formula R—O—CO—NX—CHR'—O—CHR'—NX—CO—O—R,
  and methylene-biscarbamate groups, having a structure

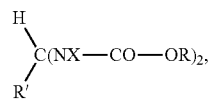

which are adducts made from carbamates R—O—CO—NH$_2$, as detailed supra, and aldehydes R'CHO. These adducts reduce the viscosity of the rubber compound mixture, but subsequently co-react with the rubber materials during vulcanisation. It is also preferred to use oligomeric or polymeric molecules having at least one of the groups mentioned.

DETAILED DESCRIPTION OF THE PREFERRED EMBODIMENTS

The most preferred reactive diluents are adducts AC of aliphatic aldehydes A and carbamates C.

Most useful carbamates C for the invention are esters of monohydric or polyhydric alcohols and carbamic acid, of formula R(—O—CO—NHX)$_n$, where R is an aliphatic monovalent (n=1) or polyvalent (n>1) radical having from one to thirty carbon atoms, and may be linear, branched, or cyclic, or a mixed aliphatic-aromatic mono- or polyvalent radical having from six to thirty carbon atoms, wherein only aliphatic carbon atoms bear the oxycarbonylamino group —O—CO—NHX. Mixtures of these carbamates may also be used. The carbamates of formula R(—O—CO—NHX)$_n$ can preferably be derived from linear alkyl radicals, or branched alkyl radicals, or cyclic alkyl radicals. It is also possible to use aralkyl radicals as radical R, such as benzyl, 2-phenylethyl, and α,α-dimethylbenzyl radicals. Preferred are n-propylcarbamate, isopropyl carbamate, n-butyl carbamate, isobutyl carbamate, sec.-butyl carbamate, tert.-butyl carbamate, n-pentyl carbamate, n-hexyl carbamate, n-octyl carbamate, 2-ethylhexyl carbamate, decyl- and isodecyl carbamate, tridecylcarbamate, and mixtures of these.

Dicarbamates H$_2$N—CO—O—R"—O—CO—NH$_2$ derived from dihydric alcohols such as ethylene glycol and 1,4-butanediol, with R" being an alkylene diradical having from two to forty carbon atoms can also be used, preferably in combination with monocarbamates.

Addition of aliphatic aldehydes A of formula R'—CHO to the carbamates C as mentioned supra yields N-alkylol compounds AC, in the case of monocarbamates represented by formula R—O—CO—NX—CHR'—OH which can also be etherified with alkanols to form N-alkoxyalkyl compounds.

These adducts, again in the case of a monocarbamate, have at least one structural element selected from
N-methylol carbamate groups of formula R—O—CO—NX—CHR'—OH,
dimethyl ether structures of formula R—O—CO—NX—CHR'—O—CHR'—NX—CO—O—R,
an N-alkyleneamide structure of formula

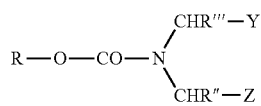

where R" and R'" may independently from each other be H or an alkyl of from 1 to 8 carbon atoms, or an aryl of from 6 to 20 carbon atoms, and Y and Z may independently from each other be —O— or —N<, and methylene-biscarbamate groups, having a structure

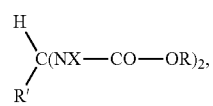

and are adducts made from carbamates R—O—CO—NH$_2$, as detailed supra, and aldehydes R'CHO.

The entity X can be a hydrogen atom, or an alkylol group derived from an aldehyde, such as —CH$_2$OH if derived from formaldehyde, or —CH(R')OH if derived from an aliphatic aldehyde of formula R'—CHO, or a further structure

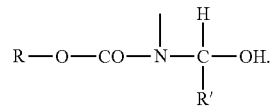

These carbamate-aldehyde resins AC are preferably oligomeric or polymeric in nature, i.e. they contain at least three, and up to nine (referred to as "oligomeric" in the connection of this invention) or at least ten (referred to as "polymeric" in the connection of this invention) repeating units per molecule.

Rubber compounds modified with reaction products AC based on alkyl carbamates and aldehydes are particularly suited for the production of tyres. They have the important and unexpected property that they act as diluent during the compounding phase, by lowering the viscosity of the composition, and thus facilitating the mixing and kneading process, but take part to at least a small extent, in the crosslinking reactions in the rubber compound, and thus enhance the mechanical properties such as shear strength, bending strength, and tear strength, the corresponding moduli, and the elasticity.

Other functional reactive diluents having at least one epoxide group are preferably liquid epoxide functional compounds, such as epoxidised fatty acids or esters thereof, epoxidiesed oils such as epoxidised soy bean oil, glycidyl ethers or polyhydric alcohols such as butanediol diglycidyl ether and hexanediol diglycidyl ether, glycidyl ethers of glycerol, trimethylolpropane and pentaerythritol, and glycidyl ethers of oligomeric glycols such as oligomeric propylene glycol and oligomeric ethylene glycol, and also epoxy resins based on bisphenol A, bisphenol F, mixtures of these, and also particularly preferably, liquid epoxy resins based on novolaks. These epoxy resins are oligomeric or polymeric in nature, i.e. they contain at least three (oligomeric) or at least ten (polymeric) repeating units per molecule. They can be cured preferably during the vulcanisation of the rubber through addition of customary curing agents for epoxy resins, preferably by addition of aminic curing agents. These resins also impart additional strength and stiffness to the rubber compound, as does the reactive diluent based on adducts of carbamates and aldehydes.

Further functional reactive diluents comprise aziridine functional compounds having at least one aziridine group per molecule, particularly those derived from alkoxylated polyhydric alcohols which are esterified with olefinically unsaturated acids such as acrylic or methacrylic or vinylacetic acid. These aziridines can react with active hydrogen, particularly in the form of carboxylic acid groups. This reactive diluent is particularly useful in chlorinated rubber having also carboxylic acid functionality, referred to as CRACA, as described by Shelby F. Thames and Z. Alex He in Industrial Crops and Products, vol. 2 (1994), pages 83 to 88.

It is also possible to add, as functional reactive diluents, compounds having at least one isocyanate group in a molecule, preferably two or more, preferred isocyanates being trimerisation products of diisocyanates such as the isocyanurate made from hexamethylene diisocyanate (N,N',N''-tris-(6-isocyanatohexyl)-1,3,5-triazine-2,4,6-trione), and the isocyanurate of toluoylene diisocyanate. Such reactive diluents are particularly useful in hydroxyfunctional rubber compounds such as compounds comprising hydroxyl-terminated styrene-butadiene rubber, and hydroxyl-terminated acrylonitrile-butadiene rubber, and diene rubber grades having hydroxyfunctional groups as described, e.g., in WO 29000/068 311 A1.

Further functional reactive diluents are compounds comprising at least one carbodiimide group per molecule, these are also able to react with carboxylic acid groups present in the rubber compound.

A still further functional reactive diluent class are molecules, preferably oligomers and polymers, having at least one olefinically unsaturated group which is activated by at least one neighbouring carboxyl, carboxylic acid anhydride, or acyl halogenide group. In contrast to the liquid rubber materials described supra, they provide additional crosslinking sites in addition to co-vulcanisation which takes advantage of the presence of olefinic unsaturation in the functional reactive diluents, by virtue of the activating groups which can react with amine, hydroxyl, and mercapto functionalities in the rubber compound and thus lead to an increased crosslinking density, and hence, improved mechanical properties. Useful functional reactive diluents of this class are oligomeric unsaturated oils which are at least partially grafted with unsaturated acid anhydrides such as maleic anhydride and tetrahydrophthalic anhydride, or grafted with olefinically unsaturated acids such as acrylic acid, vinylacetic acid, or with unsaturated acid chlorides such as acryloyl chloride.

It is possible to entirely replace the mineral oil component by the functional reactive diluents according to the invention, but it is also within the scope of this invention to use mixtures having a mass fraction from 1% to 99% of one or more functional reactive diluents according to this invention, and from 99% to 1% of mineral oil.

It has further been found, in the course of the investigation leading to the present invention, that the presence of phenolic reinforcing resins, in particular those of the novolak type which are subsequently cured with formaldehyde releasing substances such as hexamethylene tetramine or methylolated melamine, in combination with the aldehyde-urethane adducts AC, leads to still further enhanced hardness and stiffness. It is therefore particularly preferred to use both phenolic reinforcing resins and the aldehyde-carbamate resins AC, preferably as separate additions.

The invention is further described in the following examples.

EXAMPLES

Example 1

A resin based on n-hexylcarbamate and formaldehyde was made according to the following procedure:

Example 1.1 n-Hexyl Carbamate 14.45 kg of n-hexanol were charged into a reaction vessel equipped with a stirrer, a thermometer, a nitrogen inlet, and a dropping funnel. 1.2 g of a commercial dibutyltin oxide (Fascat 4100, Elf-Atochem) and 6.0 kg of urea were added, and the resulting mixture was heated to reflux (160° C.). The reaction was continued for five hours, and reflux was maintained by reducing the pressure. The mass fraction of residual urea in the reaction mixture had fallen to 1.0%. After separation of the excess hexanol by distillation under reduced pressure, a clear melt of n-hexyl carbamate (CAS-No. 2114-20-7) was obtained which solidified at 55° C.

Example 1.2 Adduct Resin of n-Hexyl Carbamate and Formaldehyde

The carbamate of n-hexanol made in Example 1.1 was melted to 95° C. in a reaction vessel, and 11 kg of an aqueous solution of formaldehyde having a mass fraction of formaldehyde of 37% was added over thirty minutes under stirring, and cooling to 60° C. When this temperature was reached, 90 g of an acid ion exchange resin (®Amberlyst 15 dry, sulphonic acid-functional reticulated resin based on styrene-divinylbenzene copolymers, The DOW Chemical Co.) were added, and the vessel was deaerated by evacuation-nitrogen purge cycles. The contents of the vessel were then heated up to 95° C., taking advantage of the exothermic reaction, held at that temperature for one hour, whereupon the temperature was slowly increased up to 135° C. to distil off the remaining water. The viscosity of the remaining pale yellow resin was 8.9 Pa·s, measured at 70° C. at a shear rate if $25\ s^{-1}$. A mass fraction of 0.08% of remaining formaldehyde was determined in the resin.

Example 2

Example 2.1 Base Rubber Mixture

A base rubber mixture was prepared by intimately mixing, in a Z-arm kneader, 100 kg of SMR (Standard Malaysian Rubber) and 60 kg of carbon black granules (type N 326, having a bulk density of 455 $kg/m^3$) for three hours at a temperature between 120° C. and 160° C.

Example 2.2 Test Rubber Compounds 16 kg samples from this base rubber mixture of Example 2.1 were taken and compounded in a Z-arm kneader according to the following recipe:

Addition 1 to the base mixture, the following chemicals were added in the sequence shown: 1 kg of carbon black granules as supra, 150 g of stearic acid, 500 g of zinc oxide powder ("red seal", Grillo Zinkoxid GmbH, having a sieve residue on a sieve with 42 μm mesh width of approximately 0.05% of the total mass, and a BET surface of from 3 $m^2/g$ to 5 $m^2/g$, determined in accordance with DIN 55908), 100 g of 2,2,4-trimethyl-1,2-dihydroquinoline, polymerised, 100 g of N-isopropyl-N'-phenyl-p-phenylene diamine, 600 g of a naphthenic process oil (Shell,®Gravex 973) having a refraction number determined in accordance with DIN 51423-1 of 1.506 at 20° C., and a kinematic viscosity at 20° C. of 1500 $mm^2/s$, and 1.8 kg of a non-self-curing novolak type phenolic resin (®Alnovol PN 320 rubber reinforcing resin) together with 200 g of hexamethylene tetramine Addition 2 to the base mixture, after addition of, and homogenisation with, the other additives of addition 1:

310 g of crystallised sulphur (®Crystex OT 20, with a mass fraction of 80% of elemental sulphur and 20% of naphthenic process oils), and 120 g of N,N-dicyclohexyl-2-benzothiazyl-sulphenamide (also referred to as "S-benzothiazol-2yl-N,N-dicyclohexyl-thiohydroxyl-amine", CAS No. 4979-32-2)

The base rubber mixture was charged, and additions 1 and 2 were added in sequence, and well homogenised at a temperature not exceeding 150° C. (jacket temperature).

Examples 2.3 to 2.5

Example 2.2 was repeated, with the following changes:

2.3 and 2.5: 600 g of Gravex 973 were replaced by 600 g of the adduct resin of Example 1.2 2.4 and 2.5: 200 g of hexamethylene tetramine were replaced with 250 g of a mixture of hexamethylene tetramine (200 g) and 50 g of a binder made from a mixture of EPDM rubber and an ethylene-vinyl alcohol copolymer The test results are summarised in the following table.

TABLE 1

Test Results

| Rubber mixture | unit | 2.2 | 2.3 | 2.4 | 2.5 |
|---|---|---|---|---|---|
| ΔM (Torque change, Rheometer, 150° C.) | dN · m | 42.7 | 48.3 | 16.4 | 18.5 |
| time until | | | | | |
| 5% of maximum viscosity reading | min | 1.3 | 1.7 | 1.0 | 0.8 |
| 10% of maximum viscosity reading | min | 1.9 | 2.4 | 1.3 | 1.1 |
| 90% of maximum viscosity reading | min | 13.5 | 15.2 | 5.2 | 4.9 |
| 95% of maximum viscosity reading | min | 16.2 | 18.2 | 6.3 | 5.9 |
| $\sigma_b$ tensile strength at break | MPa | 14.0 | 14.3 | 17.6 | 17.6 |
| $\in_b$ elongation at break | % | 274 | 233 | 359 | 322 |
| σ (10%) | MPa | 3.0 | 4.1 | 2.7 | 3.4 |
| σ (25%) | MPa | 3.5 | 4.6 | 3.2 | 4.1 |
| σ (50%) | MPa | 4.2 | 5.5 | 4.0 | 5.1 |
| σ (100%) | MPa | 5.9 | 7.6 | 5.9 | 7.4 |
| rebound resilience at 23° C. | % | 36 | 34 | 33 | 32 |
| rebound resilience at 70° C. | % | 46 | 39 | 39 | 37 |
| Hardness (Shore A, 23° C.) | | 86 | 93 | 87 | 92 |
| Hardness (Shore A, 70° C.) | | 83 | 91 | 83 | 88 |

It can be seen by comparison of the experimental data of rubber compounds using a conventional processing oil, and rubber compounds where the processing oil has been exchanged for the aldehyde-carbamate adduct resin according to the present invention, hardness (Shore hardness), and strength at given elongations have been dramatically improved, by between 6% and 10% for Shore hardness, and by 24% to 31% for strength, while the elongation at rupture was only diminished by between 10% and 15%, and the rebound resilience by only from 6% to 15%.

Example 3 Effect of Addition Sequence

An adduct resin 3.1 was prepared following the recipe of Examples 1.1 and 1.2, from n-butylcarbamate and formaldehyde. The final resin contained moieties derived from n-butylcarbamate (nBC) and moieties derived from formaldehyde (FA) in a stoichiometric ratio of n(nBC):n(FA)=1.0 mol/mol, where n(X) stands for the amount of substance n of component X.

A base rubber mixture 3.2 was prepared by intimately mixing, in a Z-arm kneader, 100 kg of SMR (Standard Malaysian Rubber) and 60 kg of carbon black granules (type N 326, having a bulk density of 455 kg/m³) for three hours at a temperature between 120° C. and 160° C. To this base rubber mixture, the following components were added in sequence:

Additions 1 (denoted by "A1", one after the other, in the sequence of the rows in the table), Curing Agent (denoted by "C"), Additions 2 (denoted by "A2", one after the other, in the sequence of the rows in the table).

TABLE 2

Composition of Rubber Compounds (mass of components)

| Rubber Mixture | 3.01 | 3.02 | 3.03 |
|---|---|---|---|
| Base Rubber Mixture 3.2 | 160.0 g | 160.0 g | 160.0 g |
| A1: Carbon Black N 330 [1] | 10.0 g | 10.0 g | 10.0 g |
| A1: stearic acid | 1.5 g | 1.5 g | 1.5 g |
| A1: zinc oxide [2] | 5.0 g | 5.0 g | 5.0 g |
| A1: ®Vulkanox HS [3] | 1.0 g | 1.0 g | 1.0 g |
| A1: ®Vulkanox 4010 [4] | 1.0 g | 1.0 g | 1.0 g |
| A1: Adduct Resin 3.1 | | 6.0 g | |
| A1: phenol novolak [5] | | 9.0 g | |
| A1: mixture of adduct resin 3.1 and phenol novolak [6] | 9.0 g | | 15.0 g |
| C: hexamethylene tetramine | 1.0 g | 1.0 g | 1.0 g |
| A2: Sulphur [7] | 3.1 g | 3.1 g | 3.1 g |
| A2: ®Vulkacit NZ [8] | 1.2 g | 1.2 g | 1.2 g |

[1] Carbon Black N 330 (having a bulk density of 375 kg/m³)
[2] zinc oxide powder("red seal", Grillo Zinkoxid GmbH)
[3] 2,2,4-trimethyl-1,2-dihydroquinoline, polymerised
[4] N-isopropyl-N'-phenyl-p-phenylene diamine
[5] non-self-curing novolak type phenolic resin ( ®Alnovol PN 320)
[6] mixture of adduct resin 3.1 (mass fraction: 40%) and phenol novolak 5 supra (mass fraction 60%), as described in EP 2 253 649 A1
[7] ®Crystex OT 20, with a mass fraction of 80% of elemental sulphur and 20% of naphthenic process oils
[8] N-tert.butyl-benzothiazyl-sulphenamide, CAS No. 000095-31-8

The base rubber mixture was charged, and additions 1, curing agent C, and addition 2 were added in the sequence of table 2, and well homogenised in a rheometer at a temperature not exceeding 150° C. (jacket temperature). The following physical properties were measured on these samples:

TABLE 3

Results

| Rubber mixture | | 3.01 | 3.02 | 3.03 |
|---|---|---|---|---|
| Mooney-viscosity | | 121 | 104 | 125 |
| torque increase | dN · m | 52.3 | 53.6 | 52.1 |
| time until | | | | |
| 5% of maximum viscosity reading | min | 1.3 | 1.6 | 1.4 |
| 10% of maximum viscosity reading | min | 7.8 | 8.8 | 8.0 |
| tan δ measured at 0.1 s⁻¹, and 60° C. | | 0.346 | 0.316 | 0.378 |
| $\sigma_b$ tensile strength at break | MPa | 18.8 | 21.3 | 17.8 |
| $\in_b$ elongation at break | % | 261 | 299 | 240 |
| rebound resilience at 23° C. | % | 37 | 34 | 37 |
| rebound resilience at 70° C. | % | 45 | 41 | 43 |
| Hardness (Shore A, 23° C.) | | 91 | 94 | 93 |
| Hardness (Shore A, 70° C.) | | 88 | 89 | 88 |

It can be seen that by separate addition of the reactive diluent (the adduct resin of example 3.1), there is a marked effect on the Mooney viscosity (the viscosity of the rubber compound prepared in the rheometer), as read during the mixing process. The final hardening effect of the reactive diluent (i.e. the torque after the incorporation of the reactive diluent into the rubber compound by co-reaction), can be seen from the high torque increase which is larger than for the comparative mixtures 3.01 and 3.03 where different amounts of a mixture or at least partially reacted mixture of the reactive diluent (in this case, a butyl urethane-formaldehyde adduct are added. Although the reactive diluent lowers the processing viscosity (as seen from Mooney viscosity in Example 3), and thereby also lowers the energy consumption during processing of the rubber compound, the final hardness is not impaired, but even increased over the comparative examples 3.01 and 3.03. This can be seen in the values for the Shore hardness, and the tensile strength. Even though the tensile strength is increased, the elongation at break is also increased versus the comparative experiments. A further advantage is the lower tan δ which means less losses and evolution of heat in the rubber article when exposed to mechanical influence. It is apparently of paramount importance that the reactive diluent is not consumed by reaction with other components in the rubber compound. It has been found in the investigations on which the present invention is based that in a mixture, or in the mixtures according to a preferred embodiment of EP 2 253 649 A1 wherein the novolak is prepared in the presence of a urethane-aldehyde resin, the latter resin is already reacted to a large extent with the novolak, and has thus lost completely its function and effect as reactive diluent in the rubber composition. The loss of effect is greater if the mass fraction of urethane-aldehyde resin in the mixture with a novolak is still smaller, such as 9% or 10% as in the examples of EP 2 253 649 A1. At least 50% of the N-methylol or N-methylene groups formed by addition of aldehydes to the —$NH_2$ group of the urethane, or carbamic ester, must still be present in the urethane-aldehyde resin as reactive diluent, to reach the desired effect. Simply increasing the mass of such reactive diluent has not turned out to be a viable alternative as this higher quantity tends to lower the processing viscosity of the rubber compound mixture so far that no efficient mixing is possible anymore. A premature reaction between a reactive diluent based on resinous reaction products of urethanes, or carbamic esters, and aldehydes, particularly, formaldehyde can be effectively excluded if the aldehyde resin is not added in the form of a mixture with aldehyde-reactive components such as phenolic bodies.

The invention claimed is:
1. A process for the reduction of the viscosity of a rubber mixture during compounding comprising adding at least one processing additive to the rubber before or during compounding, and separately adding at least one further functional reactive diluent based on novolaks,
   wherein the processing additive is a functional reactive diluent having at least one functional group in the molecule which is not an olefinic unsaturation, and wherein the at least one processing additive is an addition resin AC having at least one functional group in the molecule which is an N-alkylolamide group or an N-alkoxyamide group, and is not an olefinic unsaturation, which addition resin AC is made from a monofunctional aldehyde A or multifunctional aldehyde A, and an organic compound C having at least one carbamate group —O—CO—$NH_2$, and an organic radical, where the radical is selected from the group consisting of monovalent radicals R which are linear, branched or cyclic aliphatic radicals having from one to thirty carbon atoms, and aralkyl radicals, and divalent organic radicals —R'— which are linear, branched or cyclic aliphatic diradicals having from two to thirty carbon atoms and bisalkyl aryl radicals having from 8 to 30 carbon atoms, and
   wherein the separate addition of the at least one further functional reactive diluent based on novolaks provides the rubber mixture with an increased Mooney viscosity as compared to the simultaneous addition of the at least one further functional reactive diluent based on novolaks with the processing additive.

2. The process of claim 1 wherein the at least one processing additive is an addition resin AC made from a monofunctional aldehyde A and an organic compound C having at least one carbamate group —O—CO—$NH_2$, and an organic radical, where the radical is a monovalent radical R selected from the group consisting of linear, branched or cyclic aliphatic radicals having from one to thirty carbon atoms, and aralkyl radicals.

3. The process of claim 2 wherein the addition resin AC is made from a monofunctional aldehyde A and an aliphatic carbamate C having at least one carbamate group —O—CO—$NH_2$.

4. A method of use of a rubber composition obtained by the process as claimed in claim 1, comprising preparing the apex part of a tyre from a rubber composition obtained by the process as claimed in claim 1.

5. The process of claim 1 wherein R has from two to eight carbon atoms.

6. The process of claim 3 wherein the aliphatic carbamate C is selected from the group consisting of ethyl carbamate, butyl carbamate, hexyl carbamate and 2-ethylhexyl carbamate.

7. The process of claim 1 wherein the organic compound C is an araliphatic carbamate selected from the group consisting of benzyl carbamate and α,α-dimethylbenzyl carbamate.

8. The process of claim 1 wherein the organic compound C is a dicarbamate selected from the group consisting of ethylene biscarbamate, 1,2-propylene biscarbamate, 1,3-propylene bis carbamate, and 1,4-butylene biscarbamate.

9. The process of claim 1 wherein the organic compound C is a dicarbamate selected from the group consisting of xylylene biscarbamate and tetramethylxylylene biscarbamate.

10. The process of claim 3 wherein the monofunctional aldehyde is selected from the group consisting of formaldehyde, acetaldehyde, propionaldehyde, butyraldehyde, n-pentanal, and n-hexanal.

11. The process of claim 3 wherein the multifunctional aldehyde A is used, and the multifunctional aldehyde A is selected from the group consisting of glyoxal, malonaldehyde, succinaldehyde, and glutaraldehyde.

12. The process of claim 1 further comprising adding a phenolic reinforcing resin.

* * * * *